US009432697B2

(12) United States Patent
Lim et al.

(10) Patent No.: US 9,432,697 B2
(45) Date of Patent: Aug. 30, 2016

(54) MOTION PICTURE ENCODING APPARATUS AND METHOD THEREOF

(71) Applicants: Electronics and Telecommunications Research Institute, Daejeon (KR); Kwangwoon University Industry-Academic Collaboration Foundation, Seoul (KR); University-Industry Cooperation Group of Kyung Hee University, Yongin-si (KR); Korea Advanced Institute of Science and Technology, Daejeon (KR)

(72) Inventors: Sung-Chang Lim, Daejeon (KR); Ha Hyun Lee, Daejeon (KR); Hui Yong Kim, Deajeon (KR); Se Yoon Jeong, Daejeon (KR); Suk Hee Cho, Daejeon (KR); Hae Chul Choi, Daejeon (KR); Jong Ho Kim, Daejeon (KR); Jin Ho Lee, Daejeon (KR); Jin Soo Choi, Daejeon (KR); Jin Woo Hong, Daejeon (KR); Dong Gyu Sim, Seoul (KR); Seoung Jun Oh, Seoul (KR); Gwang Hoon Park, Yongin-si (KR); Mun Churl Kim, Daejeon (KR); Neung Joo Hwang, Seoul (KR); Sea Nae Park, Seoul (KR)

(73) Assignees: ELECTRONICS AND TELECOMMUNICATIONS RESEARCH INSTITUTE, Daejeon (KR); KWANGWOON UNIVERSITY INDUSTRY-ACADEMIC COLLABORATION FOUNDATION, Seoul (KR); UNIVERSITY-INDUSTRY COOPERATION GROUP OF KYUNG HEE UNIVERSITY, Yongin-si (KR); KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 0 days.

(21) Appl. No.: 15/049,854

(22) Filed: Feb. 22, 2016

(65) Prior Publication Data

US 2016/0173909 A1    Jun. 16, 2016

Related U.S. Application Data

(63) Continuation of application No. 14/821,862, filed on Aug. 10, 2015, now Pat. No. 9,282,342, which is a continuation of application No. 14/040,132, filed on Sep. 27, 2013, now Pat. No. 9,148,662, which is a continuation of application No. 13/389,324, filed as application No. PCT/KR2010/005186 on Aug. 6, 2010, now Pat. No. 8,989,262.

(30) Foreign Application Priority Data

Aug. 7, 2009  (KR) ........................ 10-2009-0072630
Dec. 21, 2009  (KR) ........................ 10-2009-0128064
Aug. 6, 2010  (KR) ........................ 10-2010-0075931

(51) Int. Cl.

| H04N 7/26 | (2006.01) |
|---|---|
| H04N 19/625 | (2014.01) |
| H04N 19/50 | (2014.01) |
| H04N 19/124 | (2014.01) |
| H04N 19/176 | (2014.01) |
| H04N 19/60 | (2014.01) |
| H04N 19/12 | (2014.01) |
| H04N 19/14 | (2014.01) |
| H04N 19/18 | (2014.01) |
| H04N 19/182 | (2014.01) |
| H04N 19/107 | (2014.01) |
| H04N 19/11 | (2014.01) |
| H04N 19/119 | (2014.01) |
| H04N 19/122 | (2014.01) |
| H04N 19/13 | (2014.01) |
| H04N 19/139 | (2014.01) |
| H04N 19/159 | (2014.01) |
| H04N 19/44 | (2014.01) |
| H04N 19/52 | (2014.01) |
| H04N 19/55 | (2014.01) |
| H04N 19/593 | (2014.01) |
| H04N 19/615 | (2014.01) |
| H04N 19/91 | (2014.01) |

(52) U.S. Cl.

CPC .......... *H04N 19/625* (2014.11); *H04N 19/107* (2014.11); *H04N 19/11* (2014.11); *H04N 19/119* (2014.11); *H04N 19/12* (2014.11); *H04N 19/122* (2014.11); *H04N 19/124* (2014.11); *H04N 19/13* (2014.11); *H04N 19/139* (2014.11); *H04N 19/14* (2014.11); *H04N 19/159* (2014.11); *H04N 19/176* (2014.11); *H04N 19/18* (2014.11); *H04N 19/182* (2014.11); *H04N 19/44* (2014.11); *H04N 19/50* (2014.11); *H04N 19/52* (2014.11); *H04N 19/55* (2014.11); *H04N 19/593* (2014.11); *H04N 19/60* (2014.11); *H04N 19/615* (2014.11); *H04N 19/91* (2014.11)

(58) Field of Classification Search
None
See application file for complete search history.

(56) References Cited

U.S. PATENT DOCUMENTS

| | | |
|---|---|---|
| 6,498,811 B1 | 12/2002 | Van Der Vleuten |
| 8,634,462 B2 | 1/2014 | Narroschke et al. |
| 2003/0156644 A1 | 8/2003 | Song et al. |
| 2003/0218606 A1 | 11/2003 | Zhirkov et al. |
| 2004/0008898 A1 | 1/2004 | Song et al. |
| 2006/0291556 A1 | 12/2006 | Watanabe et al. |
| 2007/0036224 A1 | 2/2007 | Srinivasan et al. |
| 2007/0286501 A1 | 12/2007 | Sato et al. |
| 2009/0092331 A1 | 4/2009 | Genda et al. |
| 2009/0110063 A1 | 4/2009 | Nakayama |
| 2013/0070845 A1 | 3/2013 | Lim et al. |
| 2014/0036994 A1 | 2/2014 | Lim et al. |

FOREIGN PATENT DOCUMENTS

| | | |
|---|---|---|
| KR | 10-2007-0057618 A | 6/2007 |
| KR | 10-2008-0007060 | 1/2008 |
| KR | 10-2008-0027190 A | 3/2008 |
| KR | 10-0813001 B1 | 3/2008 |
| KR | 10-2008-0037593 A | 4/2008 |
| KR | 10-2009-0096659 A | 9/2009 |
| WO | WO 2007/079964 A1 | 7/2007 |

OTHER PUBLICATIONS

International Search Report and Written Opinion of the International Searching Authority issued on Apr. 18, 2011, in counterpart International Application No. PCT/KR2010/005186 (13 pages, including English and Korean versions).

Final Office Action issued on Jan. 13, 2015, in counterpart U.S. Appl. No. 14/040,132 (10 pages, in English).

*Primary Examiner* — Kate Luo

(74) *Attorney, Agent, or Firm* — NSIP Law

(57) ABSTRACT

Provided is a video encoding apparatus, including a signal separator to separate a differential image block into a first domain and a second domain, based on a boundary line included in the differential image block, the differential image block indicating a difference between an original image and a prediction image with respect to the original image, a transform encoder to perform a transform encoding with respect to the first domain using a discrete cosine transform (DCT), a quantization unit to quantize an output of the transform encoding unit in a frequency domain, a space domain quantization unit to quantize the second domain in a space domain, and an entropy encoder to perform an entropy encoding using outputs of the quantization unit and the space domain quantization unit.

4 Claims, 12 Drawing Sheets

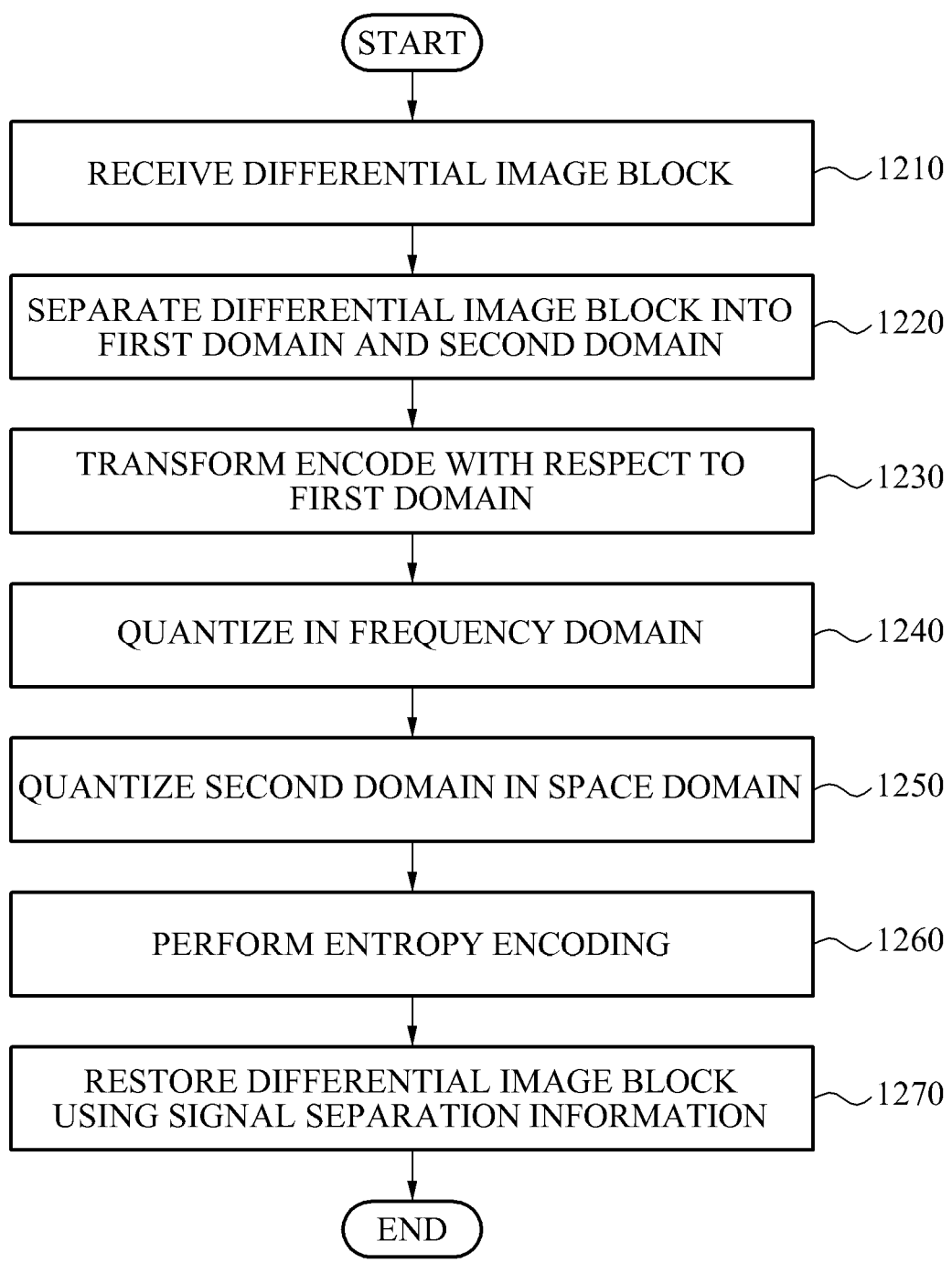

MOTION PICTURE ENCODING APPARATUS AND METHOD THEREOF

CROSS-REFERENCE TO RELATED APPLICATIONS

This application is a continuation application of Ser. No. 14/821,862 filed Aug. 10, 2015, which is a continuation application of Ser. No. 14/040,132 filed on Sep. 27, 2013, which is a continuation of application Ser. No. 13/389,324 having a 371(c) date of Oct. 2, 2012, which is a U.S. national stage application of International Application No. PCT/KR2010/005186 filed on Aug. 6, 2010. This application claims the benefit of Korean Applications Nos. 10-2009-0072630 filed on Aug. 7, 2009; 10-2009-0128064 filed on Dec. 21, 2009; and 10-2010-0075931 filed on Aug. 6, 2010. The entire contents of application Ser. Nos. 14/040,132, 13/389,324, International Application No. PCT/KR2010/005186, and Korean Application Nos. 10-2009-0072630, 10-2009-0128064, and 10-2010-0075931 are incorporated herein by reference for all purposes.

TECHNICAL FIELD

1. Technical Background

The present invention relates to a video encoding apparatus and a video encoding method.

2. Background Art

Due to studies of Moving Picture Experts Group (MPEG) of International Organization for Standardization (ISO/IEC) and Video Coding Experts Group (VCEG) of International Telecommunication Union Telecommunication Standardization Sector (ITU-T) as organizations for standardization for video compression, a number of standards such as H.261, H.263, H.264, MPEG-1, MPEG-2, and MPEG-4 have been developed. Even though a slight difference may exist, the standards have structures including an estimation and compensation of movement, transform encoding, quantization, entropy coding, and in-loop filtering.

In particular, each standard may use various block sizes associated with a transform encoding, and, usually, a discrete cosine transform (DCT) scheme is commonly adopted and used.

Generally, DCT uses a block, including a pixel value of a differential image, as an input, and a performance of DCT is known to be better as a correlation between pixel values inside of the block becomes greater.

However, since the existing video compression standardization unconditionally performs the transform encoding and a frequency domain quantization with respect to a differential image block obtained after performing a movement prediction, when a boundary domain is included inside of the differential image block, an amount of transforms to be processed is so large that a compression efficiency may decrease.

Accordingly, a new encoding scheme may be required so that the compression efficiency may not decrease even when the boundary domain is included inside of the differential image block.

DISCLOSURE OF INVENTION

Technical Goals

An aspect of the present invention provides a video encoding apparatus and video encoding method capable of minimizing a decrease of an encoding efficiency due to a boundary domain, in consideration of a characteristic of a differential image block indicating a difference between an original image and a prediction image with respect to the original image.

An aspect of the present invention provides a video encoding apparatus and video encoding method capable of enhancing an encoding efficiency, using an adaptive block partition.

An aspect of the present invention provides a video encoding apparatus and video encoding method performing a transform encoding with respect to both of a boundary domain and non-boundary domain to enhance a correlation between differential image blocks.

Technical Solutions

According to an aspect of the present invention, there is provided a video encoding apparatus, including a signal separator to separate a differential image block into a first domain and a second domain, based on a boundary line included in the differential image block, the differential image block indicating a difference between an original image and a prediction image with respect to the original image, a transform encoder to perform a transform encoding with respect to the first domain using a discrete cosine transform (DCT), a quantization unit to quantize an output of the transform encoding unit in a frequency domain, a space domain quantization unit to quantize the second domain in a space domain, and an entropy encoder to perform an entropy encoding using outputs of the quantization unit and the space domain quantization unit.

According to an aspect of the present invention, there is provided a video encoding apparatus, including a signal separator to separate a differential image block into a first domain and a second domain, based on a boundary line included in the differential image block, the differential image block indicating a difference between an original image and a prediction image with respect to the original image, a adaptive transform encoder to perform a transform encoding with respect to the first domain using a DCT, a quantization unit to quantize an output of the adaptive transform encoding unit in a frequency domain, a space domain quantization unit to quantize the second domain in a space domain, and an entropy encoder to perform an entropy encoding using outputs of the quantization unit and the space domain quantization unit.

According to an aspect of the present invention, there is provided a video encoding apparatus, including a signal separator to separate a differential image block into a first domain and a second domain, based on a boundary line included in the differential image block, the differential image block indicating a difference between an original image and a prediction image with respect to the original image, a space domain quantization unit to quantize the second domain in a space domain, a transform encoder to perform a transform encoding with respect to the second domain quantized in the space domain and the first domain, using a DCT, a quantization unit to quantize an output of the transform encoding unit in a frequency domain, and an entropy encoder to perform an entropy encoding using an output of the quantization unit.

According to an aspect of the present invention, there is provided a video encoding method, including separating a differential image block into a first domain and a second domain, based on a boundary line included in the differential image block, the differential image block indicating a difference between an original image and a prediction image with respect to the original image, performing a transform encoding with respect to the first domain using a DCT, quantizing a result of the transform encoding in a frequency domain, quantizing the second domain in a space domain, and performing an entropy encoding using a quantized result in the frequency domain and a quantized result in the space domain.

According to an embodiment of the present invention, by separating a differential image block into a non-boundary domain and boundary domain based on a boundary line included in the differential image block to increase an energy compaction, a number of transform efficiencies to be encoded after a quantization may be decreased.

According to an embodiment of the present invention, by separating a differential image block into a non-boundary domain and boundary domain based on a boundary line included in the differential image block, a compression efficiency or encoding efficiency of a video image may be enhanced.

BRIEF DESCRIPTION OF DRAWINGS

FIG. 12 is a flowchart illustrating a video encoding method according to an embodiment of the present invention.

BEST MODE FOR CARRYING OUT THE INVENTION

Figure 1:
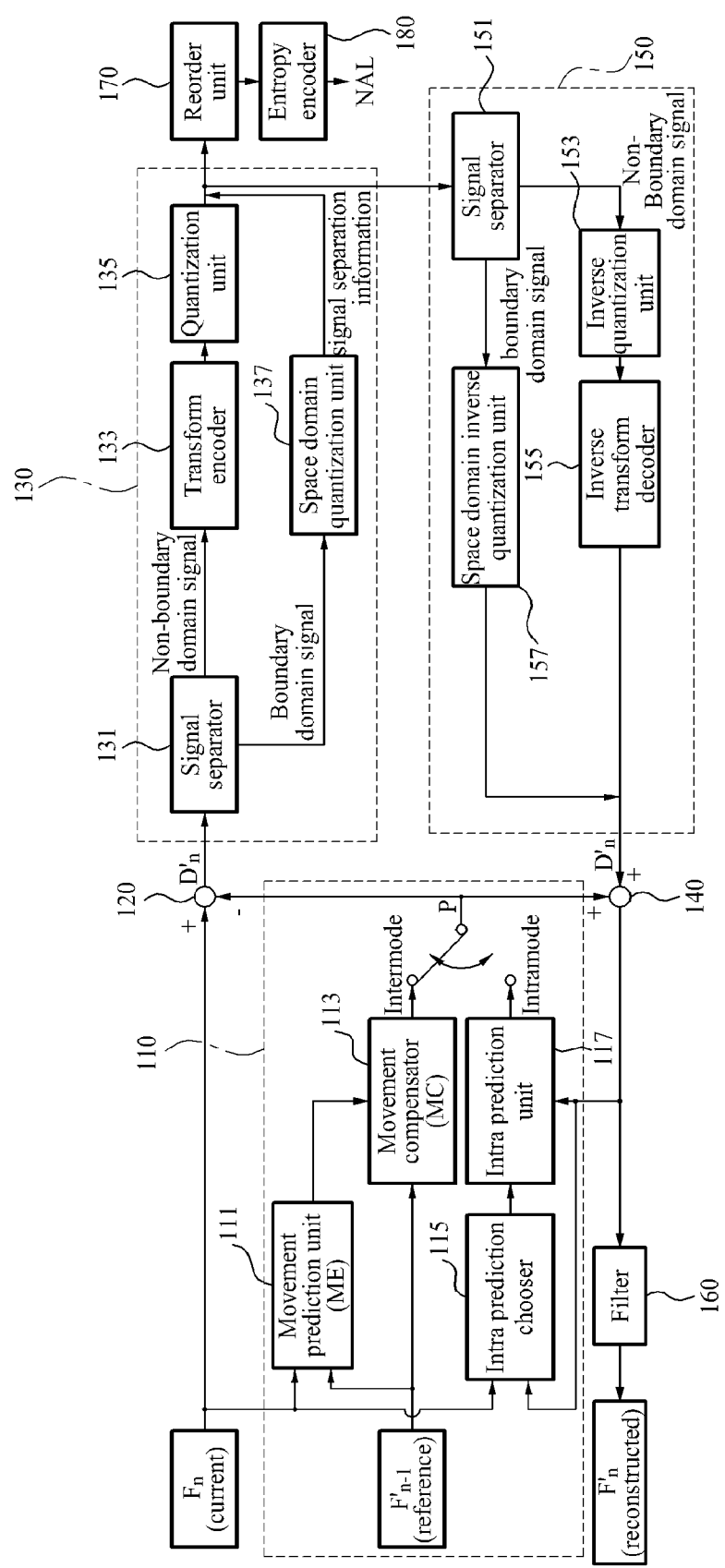
FIG. 1 is a block diagram illustrating a video encoding apparatus according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a block diagram illustrating a video encoding apparatus according to an embodiment of the present invention.

Referring to FIG. 1, the video encoding apparatus may include an image prediction unit 110, a subtracter 120, an encoder 130, an adder 140, a decoder 150, a filter 160, a reorder unit 170, and an entropy encoder 180.

The image prediction unit 110 may generate a prediction image with respect to an original image currently being a target for encoding, and may include a movement prediction unit (ME) 111, a movement compensator (MC) 113, an intra prediction chooser 115, and intra prediction unit 117. A high efficiency video coding (HEVC) standard document may be referred regarding to each component of the image prediction unit 110.

The subtracter 120 may generate a differential image block using the original image and the prediction image. The subtracter 120 may generate the differential image block by subtracting the prediction image generated in the image prediction unit 110 from the original image targeted to be encoded.

The image prediction unit 110 may generate the prediction image by predicting or estimating a movement to encode a predetermined size of image block in a current frame ($F_n$) targeted to be encoded, and the subtracter 120 may generate a differential image block ($D_n$) by subtracting the prediction image from the predetermined size of image block.

The encoder 130 may encode the differential image block ($D_n$) so that the differential image block ($D_n$) may be used for restoring the differential image block in the decoder 150 corresponding to the encoder 130.

The encoder 130 may include a signal separator 131, a transform encoder 133, a quantization unit 135, and a space domain quantization unit 137.

The signal separator 131 may separate the differential image block into a first domain and a second domain, based on a boundary line included in the differential image block. Here, the differential image block may indicate a difference between the original image and the prediction image with respect to the original image.

Also, the first domain indicates a domain excluding the boundary line, that is a non-boundary domain, and the second domain indicates a domain including the boundary line, that is a boundary domain.

The boundary domain may correspond to a domain including the boundary line of block separation for a movement compensation and a prediction in a screen.

The signal separator 131 may set the domain excluding the boundary line included in the differential image block as the non-boundary domain, and may set the domain including the boundary line as the boundary domain. The differential image block may be separated into two domains, that is, the boundary domain and non-boundary domain, through the signal separator 131. The video encoding apparatus may separately transmit signal separation information to the decoder 150 to separate the domain in the signal separator 151 of the decoder 150, similar to the signal separator 131 in the encoder 130.

The signal separation information may include at least one of coordinate information indicating locations of the non-boundary domain and the boundary domain, and an indicator indicating a domain to which each block included in the non-boundary domain and the boundary domain belongs, between the non-boundary domain and the boundary domain.

Thereafter, a transform encoding and quantization may be performed with respect to the non-boundary domain, and a space domain quantization may be performed with respect to the boundary domain.

The signal separator 131 may separate the differential image block into the boundary domain and the non-boundary domain so that a number of blocks included in the boundary domain may be a minimum.

The transform encoder 133 may perform a transform encoding with respect to the non-boundary domain using a discrete cosine transform (DCT).

The quantization unit 135 may quantize an output, that is, the discrete cosine transformed non-boundary domain, of the transform encoding unit 133 in a frequency domain.

The space domain quantization unit 137 may quantize the boundary domain in a space domain.

Signals inputted to each of the quantization unit 135 and the space domain quantization unit 137 may have the same values as signals outputted from the quantization unit 135 and the space domain quantization unit 137.

When a signal inputted to the quantization unit 135 or the space domain quantization unit 137 is one-to-one mapped to a signal outputted from the quantization unit 135 or the space domain quantization unit 137, the quantization unit 135 and the space domain quantization unit 137 may be omitted.

Each signal passed through the quantization unit 135 and the space domain quantization unit 137 may passed through the reorder unit 170 and the entropy encoder 180, thereafter.

The decoder 150 may separate a signal in the same scheme as a scheme the encoder 130 uses, using the received signal separation information.

A domain (boundary domain) quantized by the encoder 130 in the space domain may be inverse quantized by the decoder 150 in the space domain, and a domain (non-boundary domain) transform encoded and quantized in the frequency domain by the encoder 130 may be inverse quantized in the frequency domain and then inverse encoded by the decoder 150.

The decoder 150 may restore the original differential image block by performing the inverse quantization, inverse DCT, and space domain inverse quantization with respect to a signal transform encoded and quantized by the encoder 130.

The decoder 150 may restore the differential image block using the signal separation information indicating that the differential image block is separated into the non-boundary domain and the boundary domain.

The decoder 150 may include the signal separator 151, an inverse quantization unit 153, an inverse transform decoder 155, and a space domain inverse quantization unit 157.

The signal separator 151 may separate the signal that is transform encoded and quantized by the encoder 130 into the non-boundary domain and the boundary domain, using the signal separation information.

The space domain inverse quantization unit 157 may inverse quantize a boundary domain signal in the space domain.

The inverse quantization unit 153 may inverse quantize a non-boundary domain signal in the frequency domain.

The inverse transform decoder 155 may perform inverse DCT with respect to the inverse quantized non-boundary domain signal.

The reorder unit 170 may reorder each signal that quantized in the frequency domain and quantized in the space domain.

During the reordering, the reorder unit 170 may use a zigzag scanning scheme generally used with respect to the boundary domain quantized in the space domain, and may use a scanning scheme that scans while circling around in a spiral starting from a boundary line, that is, a line separating the boundary domain and the non-boundary domain.

Generally, an image signal may have a characteristic of gradually changing based on the boundary line. Thus, in a case of scanning while circling around in a spiral starting from the boundary line, signals having similar magnitudes may be grouped to enhance an efficiency of an image encoding.

The entropy encoder 180 may perform an entropy encoding using outputs of the quantization unit 135 and the space domain quantization unit 137, or may perform the entropy encoding using an output of the reorder unit 170.

The above-described procedure in the video encoding apparatus may be applied to a decoding in a video decoding apparatus corresponding to the video encoding apparatus.

FIG. 2 through FIG. 5 are diagrams illustrating that the video encoding apparatus of FIG. 1 separates a differential image block into a non-boundary domain and boundary domain, based on a form of boundary line included in the differential image block.

Figure 2:
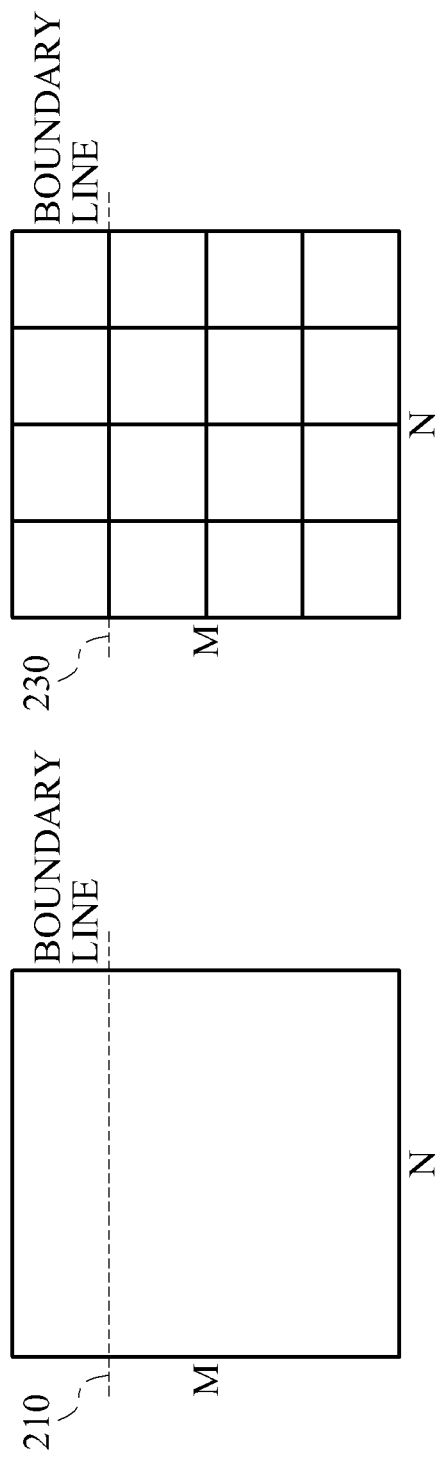
FIG. 2 through FIG. 5 are diagrams illustrating that the video encoding apparatus of FIG. 1 separates a differential image block into a non-boundary domain and boundary domain, based on a form of boundary line included in the differential image block.

Referring to the left diagram of FIG. 2, it may be assumed that a boundary line 210 is included in the differential image block having a size of N×M, and the boundary line 210 is even with a boundary line 230 of a boundary domain as illustrated in the right diagram. Since the boundary domain may not need to be processed, the encoder 130 may not perform a quantization with respect to the boundary domain in the boundary domain, and perform, with respect to all blocks inside of the differential image block, the transform encoding by the transform encoder 133 and the quantization in the frequency domain by the quantization unit 135.

Figure 3:
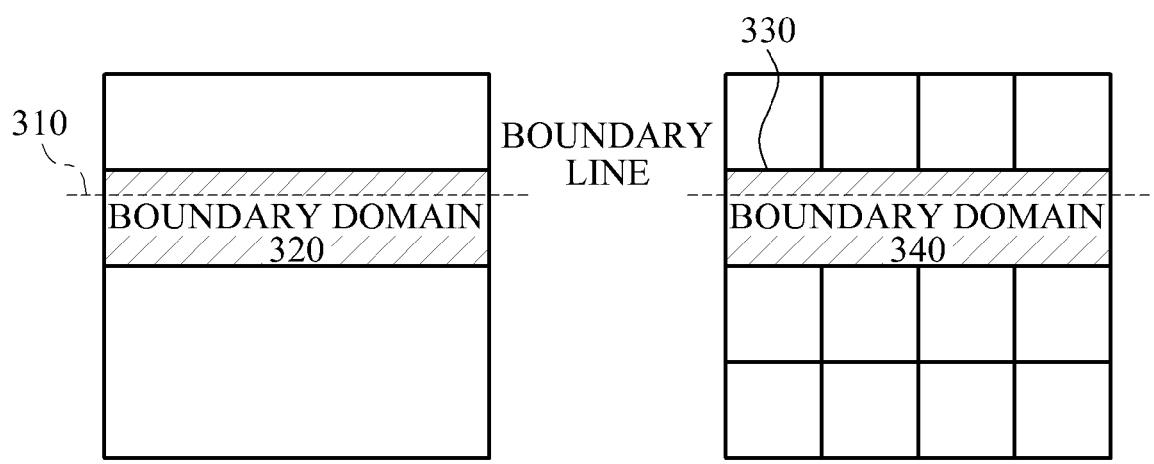

Referring to FIG. 3, a boundary line 310 inside of the differential image block may not be even with a boundary line 330 of a boundary domain 340.

When the boundary line 310 is included in a boundary domain 320 inside of the differential image block having a size of N×M as illustrated in the left diagram, the boundary line 310 may not be even with the boundary line 330 of the boundary domain 340 as illustrated in the right diagram.

Thus, the signal separator 131 may set a shaded portion as the boundary domain 340 so that a number of blocks included in the boundary domain may be a minimum.

The quantization in the space domain may be performed with respect to the boundary domain 340 by the space domain quantization unit 137. The transform encoding by the transform encoder 133 and the quantization in the frequency domain by the quantization unit 135 may be performed with respect to the remaining domain except for the boundary domain 340, that is, the non-boundary domain.

Figure 4:
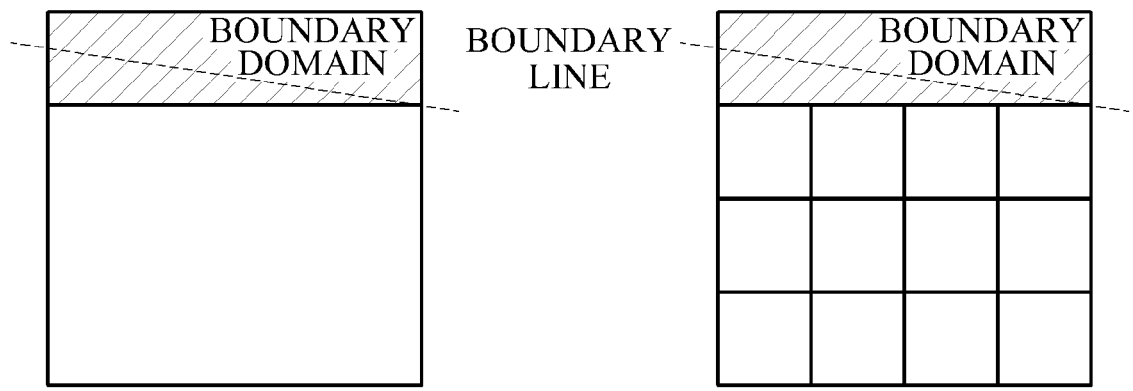

Referring to FIG. 4, the boundary line inside of the differential image block may be formed diagonally. Similar to the case of FIG. 3, the signal separator 131 may set the boundary domain so that a number of blocks included in the boundary domain including the diagonal boundary line may be a minimum. The descriptions described with reference to FIG. 3 may be referred to for further detailed operation.

Figure 5:
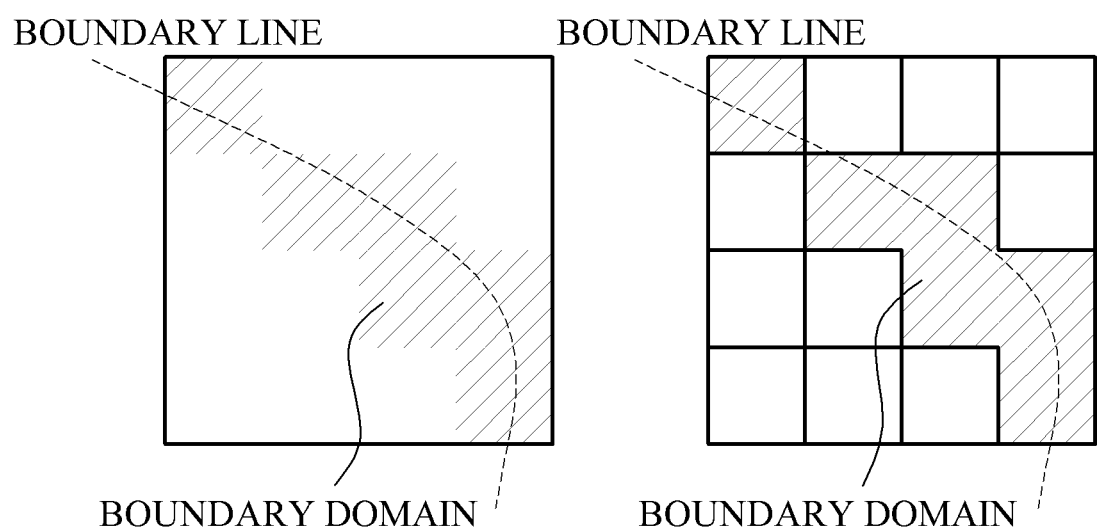

Referring to FIG. 5, the boundary line inside of the differential image block may be formed to be a curve. Similar to the case of FIG. 3, the signal separator 131 may set the boundary domain so that a number of blocks included in the boundary domain including the curved boundary line may be a minimum. The descriptions described with reference to FIG. 3 may be referred to for further detailed operation.

Figure 6:
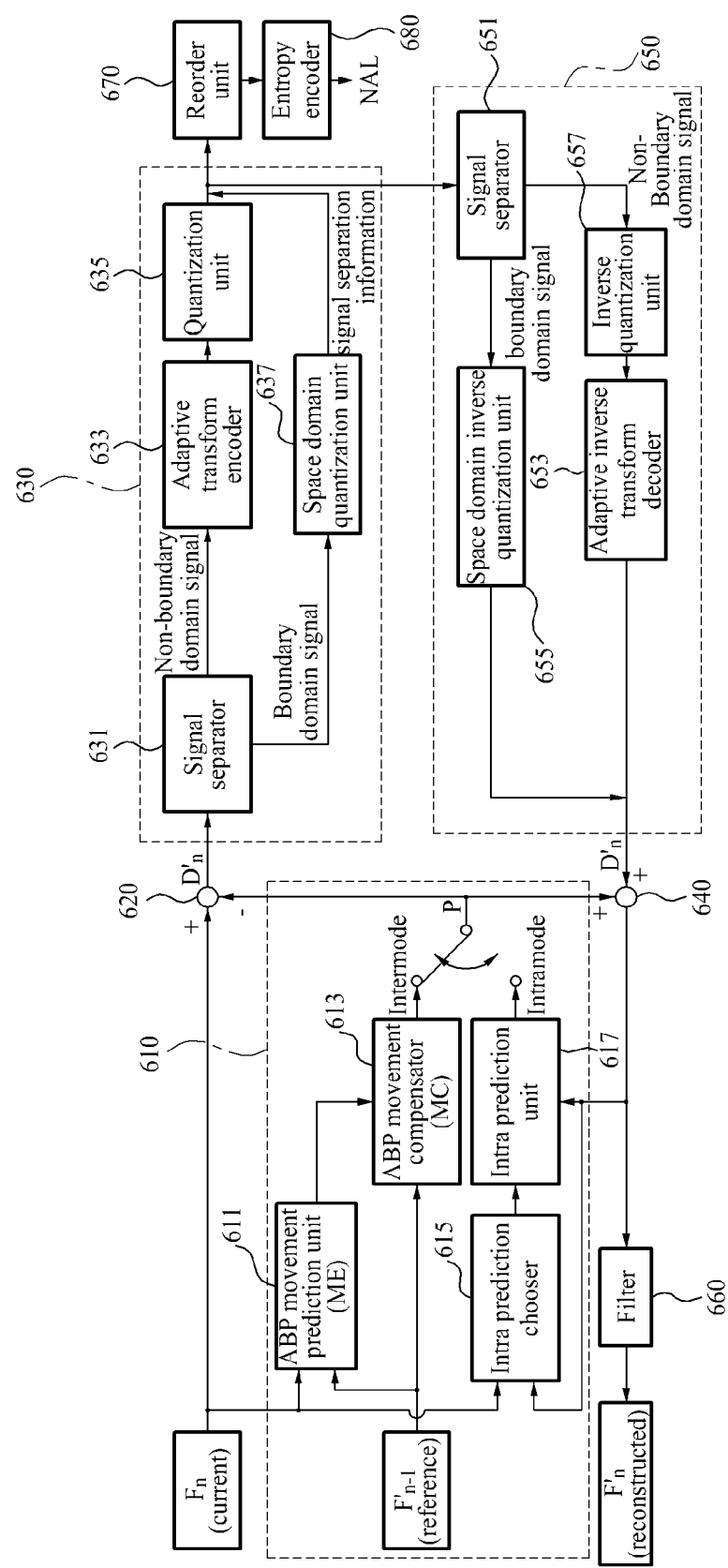
FIG. 6 is a block diagram illustrating a video encoding apparatus according to another embodiment of the present invention.

FIG. 6 is a block diagram illustrating a video encoding apparatus according to another embodiment of the present invention. FIG. 6 may illustrate the video encoding apparatus combining an adaptive block partition (ABP) scheme with the movement prediction unit 111, the movement compensator 113, the transform encoder 133, and the inverse transform decoder 155 described with reference to FIG. 1.

Referring to FIG. 6, the video encoding apparatus may include an ABP prediction unit 610, a subtracter 620, an encoder 630, an adder 640, a filter 660, a reorder unit 670, and an entropy encoder 680.

When the ABP prediction unit 610 generates a prediction image using an ABP movement prediction unit 611, the ABP prediction unit 610 may need to transmit, to a decoder 650, block separation information including information associated with the ABP.

Since a partition plane of the differential image block of FIG. 2 may be a type of a boundary plane, the partition plane may be used instead of signal separation information.

When the ABP prediction unit 610 uses the ABP movement prediction unit 611 while predicting a movement, the ABP prediction unit 610 may need to send the block separation information to the decoder 650. The encoder 630 may need to send the signal separation information to the decoder 650.

The block separation information may be a target for encoding, and may correspond to information about a partition in a form of N×16 or 16×N with respect to a macro block being a basic unit of encoding and decoding in a coder-decoder (CODEC).

The block separation information may be determined through an ABP movement prediction unit 611 and an ABP movement compensator 613 of the ABP prediction unit 610, and may be entropy encoded through the entropy encoder 680.

Depending on cases, the decoder 650 may receive, as the block separation information, block separation information entropy encoded in the entropy encoder 680.

The ABP prediction unit 610 may be substituted with the image prediction unit 110 of FIG. 1.

The encoder 630 may include a signal separator 631, an adaptive transform encoder 633, a quantization unit 635, and a space domain quantization unit 637.

The signal separator 631 may separate the differential image block into a non-boundary domain and a boundary domain, based on a boundary line included in the differential image block. Here, the differential image block may indicate a difference between an original image and a prediction image with respect to the original image.

The signal separator 631 may set a domain excluding the boundary line included in the differential image block as the non-boundary domain, and may set the domain including the boundary line as the boundary domain.

The adaptive transform encoder 633 may perform a transform encoding with respect to the non-boundary domain, using a DCT.

The quantization unit 635 may quantize an output of the adaptive transform encoding unit 633 in a frequency domain.

The space domain quantization unit 637 may quantize the boundary domain in a space domain.

The decoder 650 may restore the differential image block using signal separation information indicating that the differential image block is separated into the non-boundary domain and the boundary domain, and block partition information indicating that the non-boundary domain and the boundary domain are separated by the ABP.

An adaptive inverse transform decoder 653 may perform an adaptive inverse transform decoding after an inverse quantization with respect to the frequency domain in the same manner as the inverse quantization unit 153 performs in the frequency domain of FIG. 1, using adaptive encoding information received from the encoder 630 and based on the corresponding encoding scheme, and may perform an inverse quantization with respect to the space domain in the same manner as the space domain inverse quantization unit 157 performs.

Descriptions described with reference to FIG. 1 may be referred to for other components of FIG. 6 having the same name as in FIG. 1.

The above-described procedure in the video encoding apparatus may be applied to a decoding in a video decoding apparatus corresponding to the video encoding apparatus.

Figure 7:
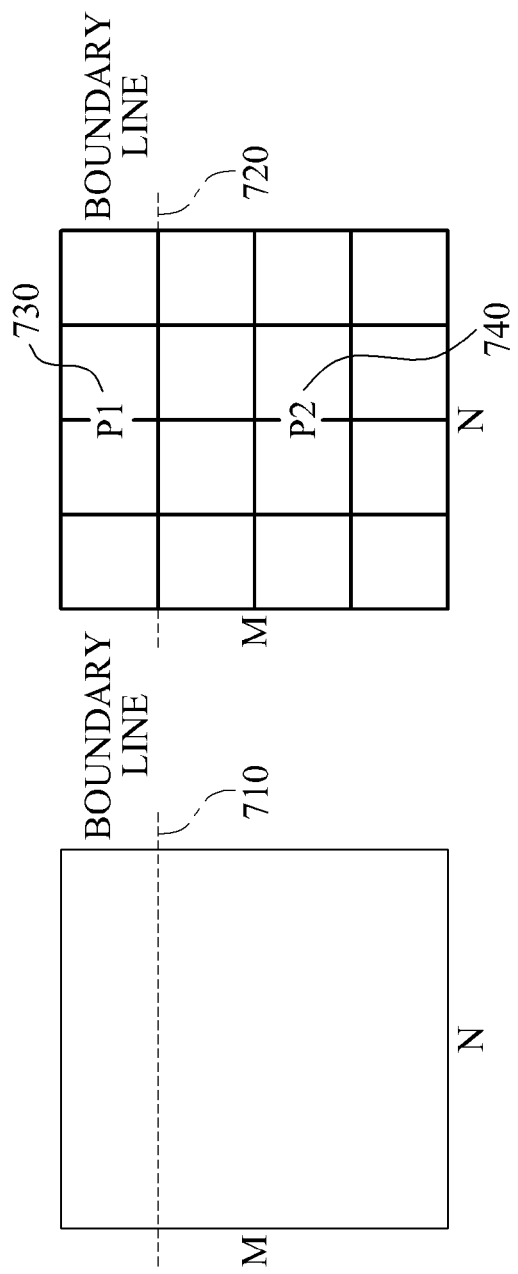
FIG. 7 and FIG. 8 are diagrams illustrating that the video encoding apparatus of FIG. 6 separates a differential image block into a non-boundary domain and boundary domain, using an adaptive block partition and based on a form of boundary line included in the differential image block.
Figure 8:
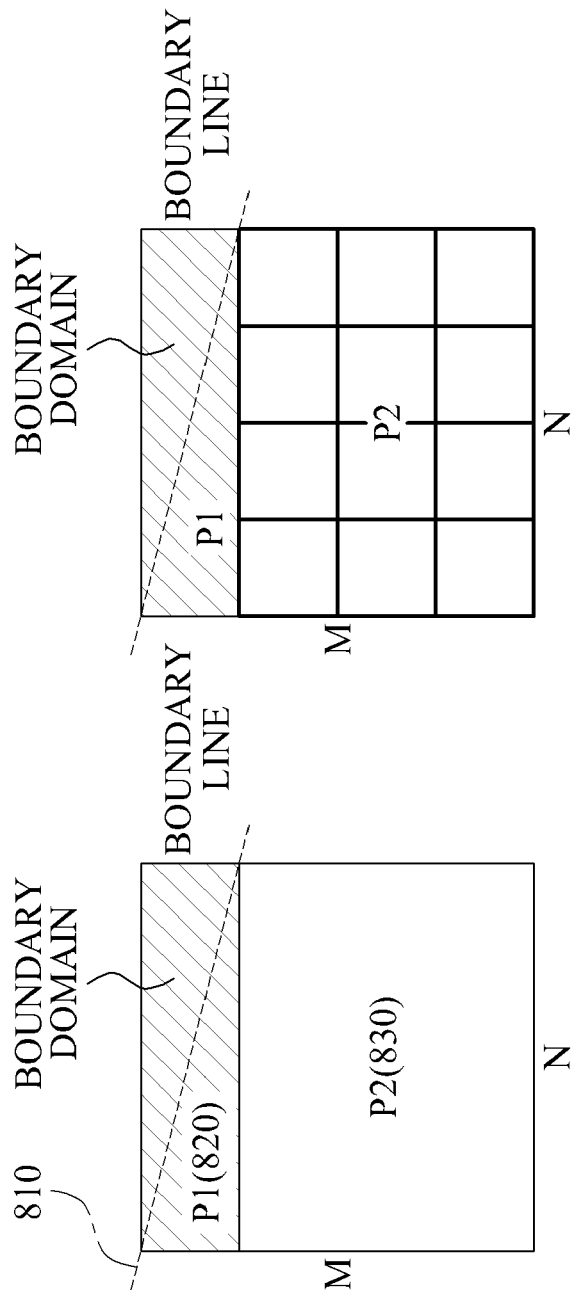

FIG. 7 and FIG. 8 are diagrams illustrating that the video encoding apparatus of FIG. 6 separates a differential image block into a non-boundary domain and boundary domain, using an adaptive block partition and based on a form of boundary line included in the differential image block.

Referring to FIG. 7, it may be assumed that a boundary line 710 is included in the differential image block having a size of N×M, and the boundary line 710 is even with a boundary line 720 of a boundary domain (P1) 730 as illustrated in the right diagram.

In this case, the video encoding apparatus may not perform the quantization in the space domain by the space domain quantization unit 635 with respect to the boundary domain (P1) 730, and may perform, with respect to all blocks in the differential image block, the adaptive transform encoding by the adaptive transform encoder 633 and the quantization in the frequency domain by the quantization unit 635.

Referring to FIG. 7, in the present embodiment, by performing a transform encoding adaptively to a location of a boundary line regardless of a location of the boundary line 710, the boundary line 720 may not included inside of the transform encoded domain, and the transform encoding may reflect a characteristic of a differential signal.

Here, when a size of the differential image block is N×M, and a size of the boundary domain (P1) is N×m, the video encoding apparatus may perform the transform encoding with respect to N×m in a case of the boundary domain (P1), and may perform the transform encoding with respect to N×(M−m) in a case of the non-boundary domain (P2).

Referring to FIG. 8, a boundary line inside of the differential image block may be formed diagonally.

When a diagonal boundary line 810 is included in a boundary domain (P1) 820 inside of the differential image block having a size of N×M, the diagonal boundary line 810 may not be even with a boundary line of a boundary domain (P1) in the differential image block as illustrated in the right diagram.

Thus, the signal separator 631 may set a shaded portion as the boundary domain (P1) so that a number of blocks included in the boundary domain may be a minimum.

The quantization in the space domain may be performed with respect to the boundary domain (P1) by the space domain quantization unit 635. The adaptive transform encoding by the adaptive transform encoder 633 and the quantization in the frequency domain by the quantization unit 635 may be performed with respect to the remaining domain, that is, the non-boundary domain (P2).

Figure 9:
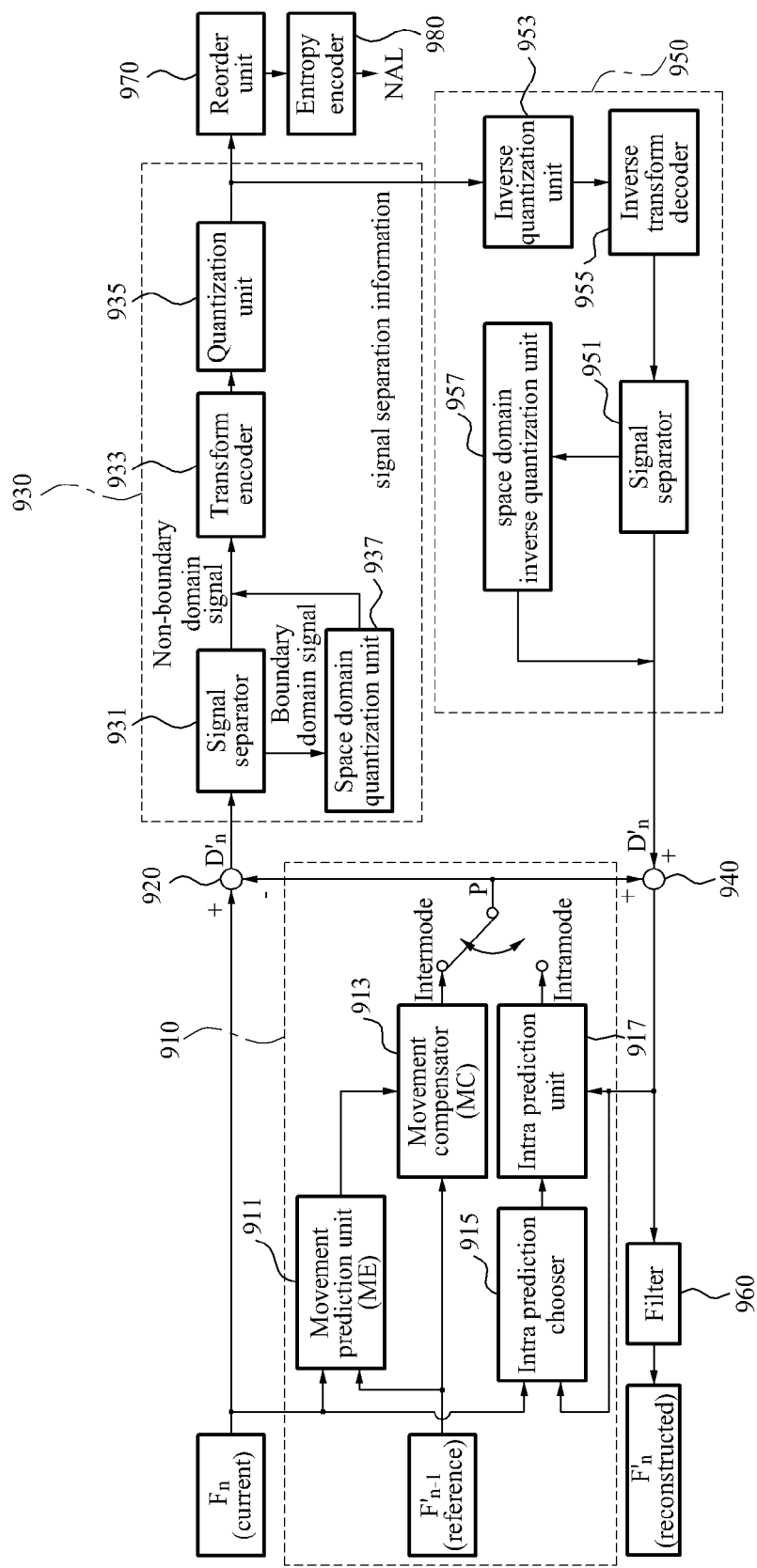
FIG. 9 is a block diagram illustrating a video encoding apparatus according to still another embodiment of the present invention.

FIG. 9 is a block diagram illustrating a video encoding apparatus according to still another embodiment of the present invention.

Referring to FIG. 9, the video encoder 930 may include a signal separator 931, a transform encoder 933, a quantization unit 935, and a space domain quantization unit 937.

The signal separator 931 may separate a differential image block into a non-boundary domain and a boundary domain, based on a boundary line included in the differential image block. Here, the differential image block may indicate a difference between an original image and a prediction image with respect to the original image.

The transform encoder 933 may perform a transform encoding with respect to the non-boundary domain and the boundary domain quantized in a space domain, using a DCT.

The quantization unit 935 may quantize an output of the transform encoding unit 933 in a frequency domain.

The space domain quantization unit 937 may quantize the boundary domain in the space domain.

As described above, the differential image block indicating a difference between the original image and the prediction image with respect to the original image may be separated into two domains through the signal separator 931. Thereafter, to induce a characteristic of the boundary domain to be similar to a characteristic of the non-boundary domain around the boundary domain, the encoder 930 may perform, with respect to the boundary domain, a space domain quantization by the space domain quantization unit 937.

Generally, the boundary domain may have a higher energy compared to the non-boundary domain, the space domain quantization unit 937 may normalize the boundary domain through the quantization in the space domain so that the energy of the boundary domain may be similar to the energy of the non-boundary domain around the boundary domain.

The encoder 930 may perform the quantization in the space domain with respect to the boundary domain before performing the transform encoding, to enhance a correlation between the non-boundary domain and the boundary domain of the differential image block.

As described above, by enhancing the correlation between the non-boundary domain and the boundary domain, a number of coefficients to be encoded after the quantization by a characteristic of a DCT may be reduced, and a compression efficiency of the video encoding may be enhanced.

An inverse quantization unit 953 in a decoder 950 may inverse quantize the non-boundary domain in the frequency domain with respect to a received signal.

An inverse transform decoder 955 may perform an inverse DCT (DCT$^{-1}$) on both the boundary domain and the non-boundary domain inverse quantized in the frequency domain through the inverse quantization unit 953.

In this instance, the inverse quantization may be performed by the inverse quantization unit 953, and the inverse transform encoding may be performed by the inverse transform decoder 955.

The non-boundary domain and the boundary domain may be separated, in the same scheme as a scheme used by the encoder 930 and using signal separation information transmitted from the encoder 930.

Thereafter, a space domain inverse quantization unit 957 may perform the inverse quantization in the space domain with respect to the boundary domain quantized by the decoder 950 in the space domain.

The space domain inverse quantization unit 957 may inverse quantize the boundary domain in the space domain.

The decoder 950 may include a signal separator 951, the inverse quantization unit 953, the inverse transform decoder 955, and the space domain inverse quantization unit 957, corresponding to the encoder 930.

The signal separator 951 may separate, into the boundary domain and the non-boundary domain, the signal separation information received from the encoder 930.

A movement prediction unit 911 and a movement compensator 913 in an image prediction unit 910 may be replaced by the ABP movement prediction unit 611 and the ABP movement compensator 613 of FIG. 6.

Components described with reference to FIG. 1 may be referred to for description of other components including a reorder unit 970 and an entropy encoder 980.

Procedures of the above-described video encoding apparatus may be applied to a video decoding apparatus corresponding to the video encoding apparatus.

Figure 10:
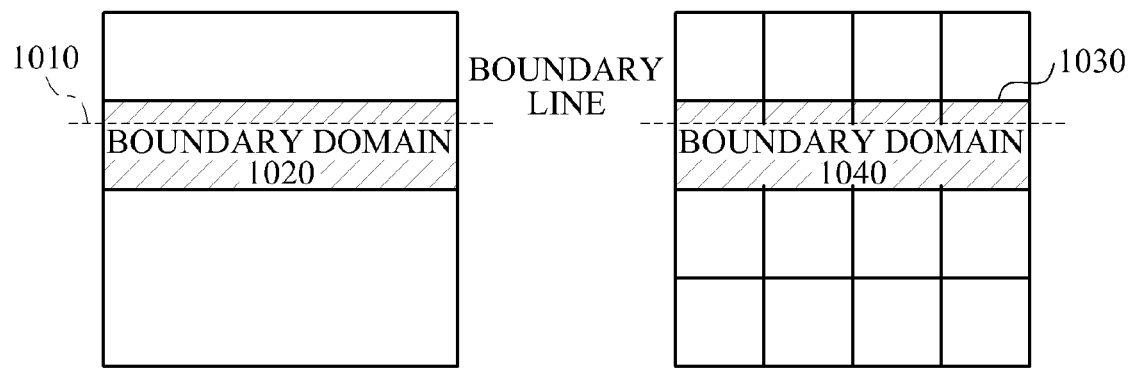
FIG. 10 is a diagram illustrating that the video encoding apparatus of FIG. 9 separates a differential image block into a non-boundary domain and boundary domain, based on a form of boundary line included in the differential image block.

FIG. 10 is a diagram illustrating that the video encoding apparatus of FIG. 9 separates a differential image block into a non-boundary domain and boundary domain, based on a form of boundary line included in the differential image block.

Referring to FIG. 10, when a boundary line 1010 is included in a boundary domain 1020 inside of the differential image block having a size of N x M as illustrated in the left diagram, the boundary line 1010 may not be even with a boundary line 1030 of a boundary domain 1040 as illustrated in the right diagram.

Thus, the signal separator 931 may set a shaded portion as the boundary domain 1040 so that a number of blocks included in the boundary domain may be a minimum. Energy with respect to the boundary domain and energy with respect to the non-boundary domain may be obtained.

The space domain quantization unit 937 may obtain a quantization value in a space domain enabling the energy with respect to the boundary domain to be normalized to the energy with respect to the non-boundary domain, and may perform the quantization in the space domain only with respect to the boundary domain. Thereafter, the encoder 930 may perform the transform encoding and the quantization in the frequency domain with respect to all domains in the differential image block as illustrated in the right diagram.

Figure 11:
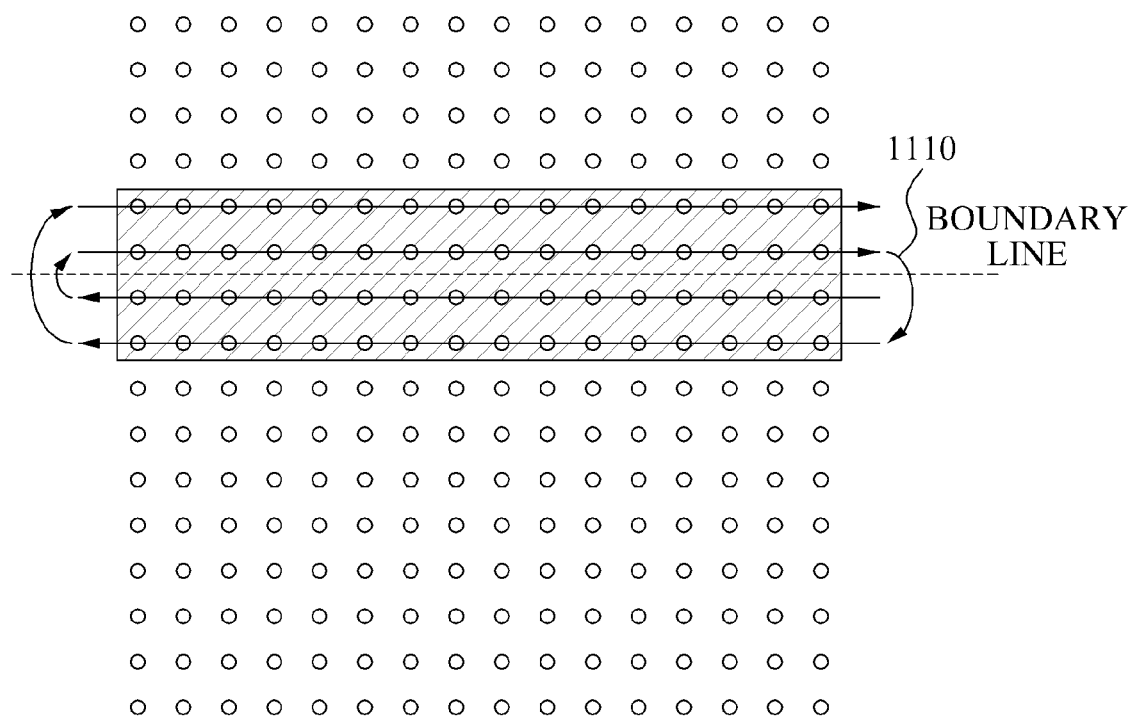
FIG. 11 is a diagram illustrating a scanning scheme with respect to a quantization result in a case of performing a space domain quantization in FIG. 10.

FIG. 11 is a diagram illustrating a scanning scheme with respect to a quantization result in a case of performing a space domain quantization in FIG. 10.

When a boundary line is included in the differential image block including the differential signal as illustrated in FIG. 11, the encoder in the video encoding apparatus may set the boundary domain, and then may perform the quantization in the space domain with respect to the boundary domain.

Thereafter, the reorder unit 970 may scan a coefficient quantized in a spiral based on a boundary line 1110. Generally, a scanning result in which signals having similar energy are grouped according to a characteristic of a video signal gradually changing around the boundary line may be obtained.

FIG. 12 is a flowchart illustrating a video encoding method according to an embodiment of the present invention.

Referring to FIG. 12, in operation 1210, the video encoding apparatus may receive, from a subtracter, a differential image block generated using an original image and a prediction image.

In operation 1220, a video encoding apparatus may separate the differential image block into a first domain and a second domain, based on a boundary line included in the differential image block. Here, the differential image block may indicate a difference between the original image and the prediction image.

Here, the first domain indicates a domain excluding the boundary line, that is a non-boundary domain, and the second domain indicates a domain including the boundary line, that is a boundary domain.

In operation 1220, the video encoding apparatus may set the domain excluding the boundary line included in the differential image block as the non-boundary domain, and may set the domain including the boundary line as the boundary domain.

In operation 1220, the video encoding apparatus may separate the differential image block into the non-boundary domain and the boundary domain so that a number of blocks included in the boundary domain may be a minimum.

In operation 1230, the video encoding apparatus may perform a transform encoding with respect to the non-boundary domain, using a DOT.

After the video encoding apparatus quantizes a transform encoded result in a frequency domain in operation 1240, the video encoding apparatus may quantize the boundary domain in a space domain.

In operation 1260, the video encoding apparatus may perform an entropy encoding using a result quantized in the frequency domain and a result quantized in the space domain.

In operation 1270, the video encoding apparatus may restore the differential image block using signal separation information indicating that the differential image block is separated into the non-boundary domain and the boundary domain.

The signal separation information may include at least one of coordinate information indicating locations of the non-boundary domain and the boundary domain, and an indicator indicating a domain to which each block included in the non-boundary domain and the boundary domain belongs, between the non-boundary domain and the boundary domain.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A video decoding method comprising:
   determining whether a current block is a fist block with a size that is not a minimum size (4×4) or a second block with a size that is a minimum size (4×4);
   when the current block is the second block, obtaining, from a bitstream, information indicating whether the current block is inverse-transformed or not, wherein the information is not signaled for the first block and is signaled for the second block;
   performing a dequantization on residual coefficients relating to the current block;
   obtaining a residual image by performing, based on the information indicating whether the current block is inverse-transformed or not, an inverse-transform on dequantized residual coefficients, the inverse-transform being performed using a discrete cosine transform (DCT); and
   generating a reconstruction image using the residual image and a prediction image resulting from performing a motion compensation.

2. The video decoding method of claim 1, wherein an encoded image containing the current block is partitioned into a plurality of blocks, part of the blocks are not inverse-transformed, the remaining blocks are inverse-transformed.

3. The video decoding method of claim 1, wherein the information indicating whether the current block is inverse-transformed or not is specified by coordinate information indicating a location of the current block.

4. The video decoding method of claim 1, wherein a size or a shape of the current block is determined based on block partition information which is signaled from the bitstream.

* * * * *